United States Patent [19]

Kawaguchi

[11] Patent Number: 4,692,036

[45] Date of Patent: Sep. 8, 1987

[54] ROLLER BEARING FOR ENDLESS LINEAR MOTION

[75] Inventor: Yoshifumi Kawaguchi, Seki, Japan

[73] Assignee: Nippon Thompson Co., Ltd., Tokyo, Japan

[21] Appl. No.: 939,006

[22] Filed: Dec. 8, 1986

[30] Foreign Application Priority Data

Jul. 18, 1986 [JP] Japan .................. 61-167826

[51] Int. Cl.$^4$ ............................................. F16C 29/06
[52] U.S. Cl. ......................................... 384/44; 384/47
[58] Field of Search ............ 384/44, 47, 43, 45; 464/168

[56] References Cited

U.S. PATENT DOCUMENTS

| | | | |
|---|---|---|---|
| 3,960,413 | 6/1976 | Abbuhl et al. | 384/47 |
| 4,215,904 | 8/1980 | Teramachi | 384/47 |
| 4,556,262 | 12/1985 | Geka | 384/44 |
| 4,563,045 | 1/1986 | Katayama | 384/44 |

Primary Examiner—Lenard A. Footland

Attorney, Agent, or Firm—Vaden, Eickenroht, Thompson & Boulware

[57] ABSTRACT

A roller bearing for endless linear motion is composed of a long size track rail having a track groove on its outer face, a slide unit having an endless circuit including a track groove, said slide unit being mounted on the rail; and rollers being arranged in cross-roller mode for the endless linear motion. The circulation path for the roller is constructed by track grooves, return path and direction changing paths. The track groove and return path are straight and parallel to each other, and the direction changing path connects the track groove and the return path at respective ends. A slightly inclined clearance groove is provided on the both ends of the track groove on the side of the slide unit, and its angle is formed greater than the angle of the track groove. The boundary line between the track groove and the clearance groove is V-shaped, seen from the end face of the track rail, and the apex of the V-shape points to the side of the clearance groove. The improvement for the track groove leads to smooth running of rollers, and consequently to reduction of slide resistance and displacement of the bearing.

2 Claims, 17 Drawing Figures

ROLLER BEARING FOR ENDLESS LINEAR MOTION

BACKGROUND OF THE INVENTION

1. Field of the Invention

The present invention relates to a roller bearing for endless linear motion comprising a long size track rail and a slide unit which is mounted on the rail to perform a relatively endless linear motion with the rollers as rolling elements, more specificially, it relates to a roller bearing for endless linear motion with the rollers being arranged in a cross-roller mode wherein a track groove thereof is improved.

2. Description of the Prior Art

FIGS. 5 and 6 show such a roller bearing 1 for endless linear motion that belongs to the technical field of the present invention. The bearing 1 is of such construction that the rollers 4 are arranged in a cross-roller mode around the skirt portion 3 of a casing 2 having a U-shaped section to allow the roller 4 to circulate endlessly. The endless circulation path of the roller bearing 1 is composed of linear track grooves 5, 5, a return path 6 formed in parallel with the track grooves 5, 5, and arc-shaped direction changing paths which are formed at the both ends of the track goove 5 and the return path 6 and connect the track groove and the return path.

The roller 4 in a load zone which is in contact with the track groove 5 formed in the track rail 7 is led, as it takes sliding motion, into the direction changing path formed within side plates 8 fixed to the both ends of the casing. The return path 6 connected to the direction changing path is formed by V-shaped grooves 10, 10 made respectively on the outer face of the casing 2 and a circulation path cover 9; the roller 4 advances, while pushed forward, from the direction changing path to the return path 6. In the drawing, 11 is a steel holding-plate of a L-shaped section, it is provided so that the roller 4 may not fall off, even when the slide unit 12 (general term for casing 2, side plate 8, cover 9, side-face seal 13, grease nipple 14, etc.) is detached from the track rail 7. Incidentally, 15 is a bottom seal. (As regards FIG. 6, assuming that the portion including the track groove 5 in the casing 2 is partitioned off from the skirt portion 3 by the alternate long and two short dash line X—X, the partitioned portion is referred to hereinafter as "a track member".)

It is known already in the above-type roller bearing for endless linear motion that the roller behavior in the boundary portion, where the roller arranged in the cross-roller mode moves from the direction changing path to the track groove in an endless circulation path, exerts a great influence on the running performance of the bearing. That is, the configuration of the boundary portion between the load zone and the no-load zone in an endless circulation path of a cross-roller mode bearing affects greatly the running performance of the bearing.

In prior arts, there is adopted a way of forming a clearance groove having a slight inclination angle in the boundary portion. FIG. 7 shows such a way, and is a longitudinal section of the track member 16, in which a V-shaped clearance grooves 17, 17 having inclination angle $\theta$ are formed at the both ends of the track groove 5. A boundary line 18 is formed at the boundary between the track groove 5 and the clearance groove 17. Since the rolling elements of the bearing of this type are cylindrical rollers arranged in cross-roller mode, the angle $2\beta$ of the track groove is 90° (FIG. 7A: a side view seen from the direction of arrow A in FIG. 7). And the angle of the clearance groove is represented as $2\alpha$ as shown in FIG. 7B (view seen from the direction of arrow B in FIG. 7).

In the prior art, an angle of groove at the boundary portion between the clearance groove and the track groove is less than $2\beta$, in order to make the angle $2\alpha$ of clearance groove to be the same as the angle $2\beta(=90°)$ of track groove. Therefore, a roller coming to said boundary portion contacts with the upper part (shoulder part) of both surfaces of said track groove, and then, said roller is lifted slightly.

Such a phenomenon mentioned above affects the behavior of said roller, and thus, the stick-slip of the bearing can not be decreased, in the prior art. As regards the irregular behavior of rollers in the boundary portion, further specific description will be given in reference to FIGS. 8–12.

FIG. 8 is a top view seen fom the direction of arrow C in FIG. 7. When angle $2\alpha$ of the clearance groove is formed, for example, into the same as the track groove $2\beta$, the boundary line 18 takes a shape of an inverted V-shape, that is, the apex will be of a shape projecting to the end face of the track groove. Since the boundary line 18 is of an inverted V-shape, the roller 4 which has moved in from the direction changing path to the clearance groove 17 is thrusted into the track groove 5 through either point P or P (depending upon an inclinaion of rollers arranged in the cross-roller mode). The instant state of the roller 4 which has just entered the load zone from the no-load zone is shown in FIG. 9.

In FIG. 9, a load or a contact stress is approximately equally distributed (shown by hatched portion 19) in the track groove 5 on the side of track rail 7. On the other hand, as regards the track groove 5 on the side of the track member 16, since the roller 4 enters the load zone (track groove 5) from point P as stated above, the track goove 5 on the side of the track member 16 and the roller 4 make their first contact only on the upper slant face (portion shown by point P) of the track groove 5. And the contact area is so small, as compared with that in the case of the track groove 5 on the side of the track rail 7, that distribution (hatched portion 20) of the load (contact stress) is seen as an extreme end-load applied in concentration to the portion of point P.

In consideration of such load (contact stress) distribution, behavior of the roller in the portion of the boundary between the clearance groove and the track goove will be explained in reference to FIG. 10. When the view of FIG. 9 is seen from the side of the track rail 7 (from the same direction as in FIG. 8), FIG. 10 is obtained. The roller 4 I which receives a load of the distribution as shown in FIG. 9 is pushed by roller 4 II illustrated with alternate long and two short dash line to receive a driving force in the direction of arrow D. Then the roller 4 I, which has received a concentrated load in point P, will behave in a manner to turn round into the direction of arrow E with point P as its center, upon receiving a driving force in the direction of arrow D. Through such turn-round motion, roller 4 I is affected by a force acting in a manner that it may be thrown out of the circulation path, and the skew (inclination of the roller) is increased. The present inventor has found that the phenomena acts to increase the resistance of the sliding motion of the bearing, and constitutes one of the reasons for the roller to take the irregular behavior.

Next, the reason for the irregular behavior of the roller will be explained below referring to FIGS. 11 and 12. FIGS. 11 and 12 are shown for explanation given in consideration of the behavior of the roller in the direction changing path, or the behavior of the roller entering the track groove 5, and the portion around the boundary line between the clearance groove and the track groove is enlarged in FIG. 12.

As is clear from FIG. 12, since roller 4 III and roller 4 II make contact with each other at point Q lower than the center of gravity of the roller 4 II, when the roller 4 III pushes the roller 4 II into the track groove, a force is added to act in a manner to push the roller 4 II upward (the direction of arrow F). That is, rollers in the direction changing path make contact with each other in the position closer to the center of the circular arc of the direction changing path (lower portion) than to the center of the gravity of the roller, as stated above, and this fact induces the fact that the roller will advance while inclining in the direction of going out of the direction changing path, and that skew (inclination of the roller) of the roller entering the load zone will be increased.

As regards rollers 4 I and 4 II, roller 4 I receives a concentrated load in the upper portion of the track groove of the track member 16 as explained in reference to FIGS. 9 and 10, accordingly when the roller 4 I receives an arrow force D, the roller will incline (skew) in the direction of the arrow G with a center of inclination located in the region of point where the roller 4 I receives a concentrated load. When the roller skews in the direction of arrow G, it slightly inclines to the direction of advance, and acts as if it might lock in the track groove at the points $S_1$ and T, consequently the sliding resistance is increased, and it constitutes a reason for stick slip of the roller.

The present applicant has made a number of proposals for resolving problems of the increase of sliding resistance and the irregular behavior of the roller in the region of the boundary line between the clearance groove and the track groove, and has obtained considerable results. For example, the applicant has made a proposal in Japanese Utility Model Application No. 19487-1985, disclosing an art for forming 3-step clearances in the both end portions of the track face (FIG. 13). In that art, the boundary line 18 between the clearance groove 17 and the track goove 5 is formed rectangularly with the longitudinal direction of the track groove, as shown in FIG. 14. Since the roller moves gradually from the no-load zone to the load zone, the running displacement (vertical displacement at the time when the bearing is in slide motion) due to irregular behavior of the roller is improved. The device of the Japanese Utility Model Application No. 19487-1985 has proved to be effective in itself, but it could not much restrain the motion of the roller to spring out of the endless circulation path, failing in obtaining a bearing having expected slide resistance and running displacement. Furthermore, working of the clearance groove in the both end portions of the track groove is complicated and this involves a rise of the manufacturing cost and wide scattering of accuracy, and the performance of the bearing is unstable.

On the other hand, recently the field of utilization of this kind of bearing has been further developed, and a bearing, which has higher running performances, less running displacement and small slide resistance, has been required, nevertheless it is still difficult for the conventional art to manufacture products to meet those demands.

SUMMARY OF THE INVENTION

The present invention is made in the light of the aforesaid disadvantages of the conventional art, an object of the invention is to provide a bearing for endless linear motion, capable of preventing increase of slide resistance and irregular behavior in the region of the boundary between the clearance groove and the track groove, further capable of holding down the working cost due to its simple construction.

As the result of repeated tests and assiduous investigation, the present inventor has found that if the angle of the clearance groove is formed greater than that of the track groove, and the boundary line between the clearance groove and the track groove is formed in V-shape as seen from the end-face side of the track rail, and if the apex of the V-shape is formed to point to the side of the clearance groove, the behavior of rollers in the region of the boundary becomes regular and the slide resistance of the roller can be reduced.

Based upon the above facts, the present invention refers to a bearing for endless linear motion, wherein said bearing comprises the rolling elements being rollers arranged in a cross-roller mode, a slide unit provided with an endless circulation path having a linear track groove, and a long-size track rail provided with a track groove formed in its outer face, the track groove of the slide unit and the track groove in the outer face of the track rail being positioned opposite each other to form a load zone of the endless circulation path for the rollers, characterized in that a slightly inclined clearance grooves is provided respectively at the both ends of the track groove on the side of the slide unit, each angle of the clearance grooves is formed greater than the angle of the track groove, and the boundary line formed between the track groove and the clearance groove takes shape of V as seen fom the side of the end face of the track rail, and the apex of the V-shape is projecting to the side of the clearance groove.

If each angle of the clearance grooves formed at the both ends of the track groove is taken to be $2\alpha$, and the inclination angle of the clearance groove is taken to be $\theta$, the following expression is preferably established;

$$\tan \alpha > 1/\cos \theta.$$

If the bearing takes the above constitution, the slide resistance in the region of the boundary line can be reduced, and the behavior of the roller becomes regular, accordingly the running displacement occurring in running of the bearing is reduced. Moreover the construction of the present bearing is not complicated, and the working cost can be held down.

BRIEF DESCRIPTION OF THE ACCOMPANYING DRAWINGS

The present invention will become clear from the following detailed descriptions given in relation with the accompanying drawings.

FIG. 1 is a view of the region of the boundary line between the track groove and the clearance groove in the track member of the bearing according to the present invention, seen from the side of the track rail.

FIG. 1A s a longitudinal section of the track member 5 shown in FIG. 1.

DETAILED DESCRIPTION OF THE EMBODIMENTS

A working example of the present invention is explained below referring principally to FIGS. 1-4; incidentally, identical symbols are given to identical elements, respectively, with those of FIGS. 5-14.

Figure 1:
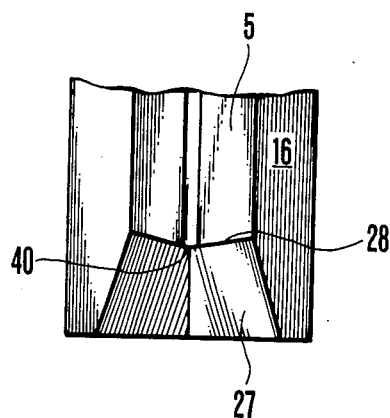
Figure 1A:
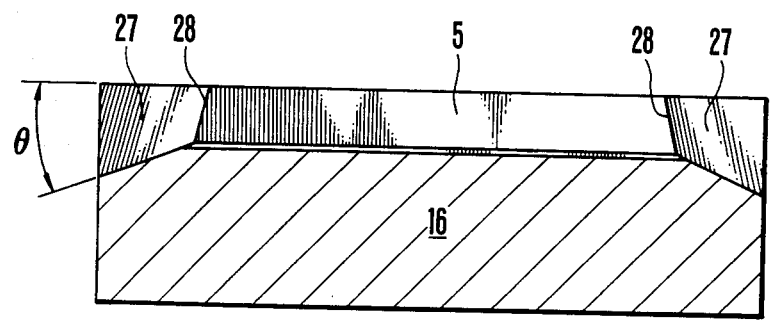
Figure 7:
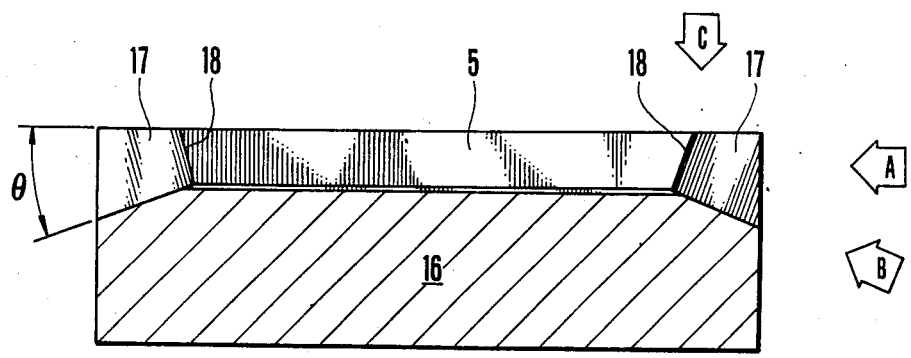
FIG. 7 is a longitudinal section of the track member.
Figure 7A:
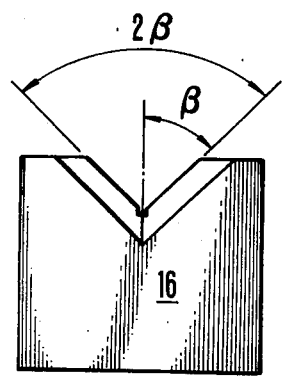
FIG. 7A is a view seen from the direction of arrow A in FIG. 7.
Figure 7B:
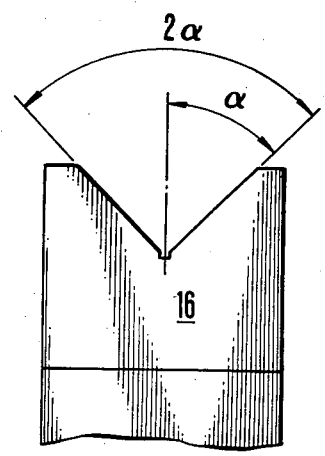
FIG. 7B is a view seen from the direction of arrow B in FIG. 7.

FIG. 1 illustrates the region of the boundary line 28 between the track groove 5 and the clearance groove 27 in the track member 16 of the bearing according to the present invention, seen from the side of the track rail (the direction of arrow C in FIG. 7). FIG. 1A is a longitudinal section of the track member 16 in FIG. 1. The boundary line 28 is of V-shape, and the apex 28 thereof points to the side of the clearance groove 17. In the case that the rollers, which roll in the track groove 5, are arranged in the cross-roller mode as stated above, the angle $2\beta = 90°$.

When analysis is carried out, under the condition of the clearance groove being taken as $\theta$ (refer to FIG. 7), in consideration of relation between $\alpha$ and $\theta$, and of the manner how the boundary line is formed, the following expression can be established with regard to FIG. 1, $$|\tan \alpha| > |1/\cos \theta|$$

Figure 8:
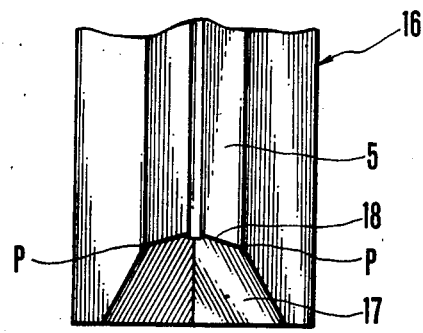
FIG. 8 is a view of a region of a track groove and a clearance groove of a conventional art, seen from the track rail, it corresponds to a view seen from the direction of arrow C in FIG. 7.
Figure 9:
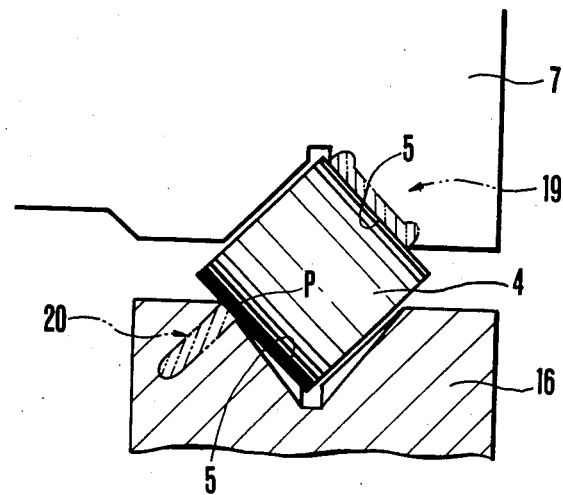
FIG. 9-12 are views illustrating behavior of rollers in the region of the boundary line between the track groove and the clearance groove.
Figure 10:
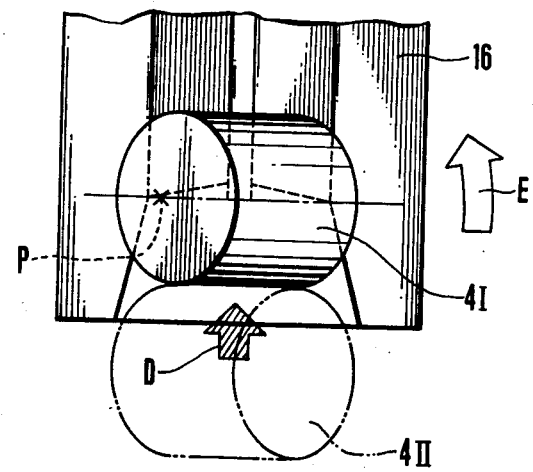
Figure 11:
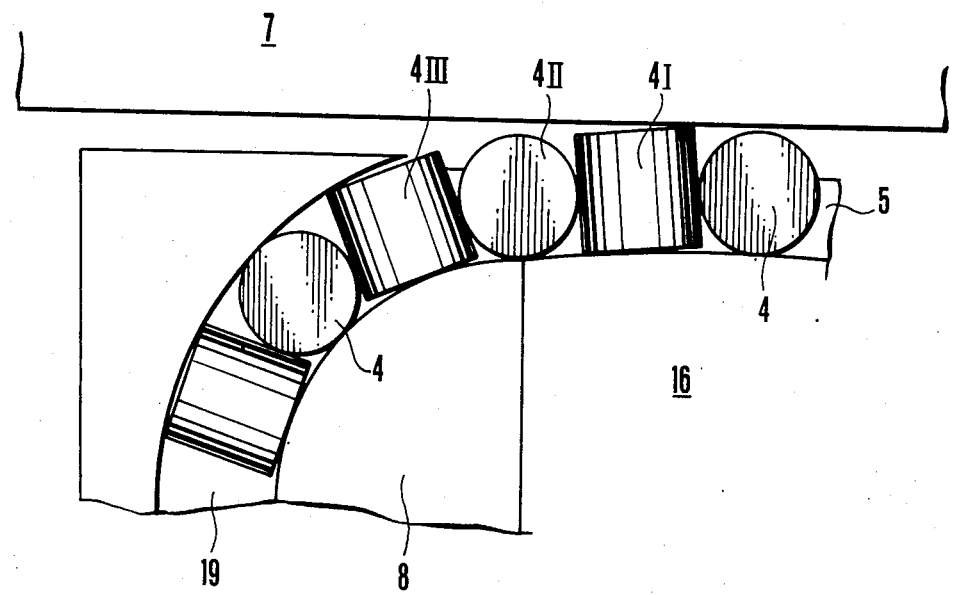
Figure 14:
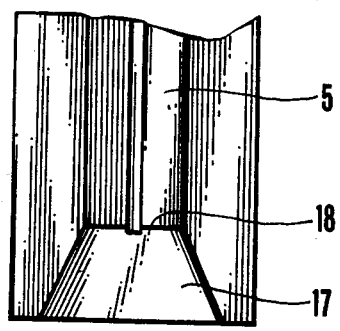
FIG. 14 is a view of a region of the boundary line between the track groove and the clearance groove in a conventional bearing shown in FIG. 13, seen from the track rail side.

(incidentially, assuming $2\beta = 90°$, an expression $\tan \alpha < 1/\cos \theta$ is established for FIG. 8, and an expression $\tan \alpha = 1/\cos \theta$ is established for FIG. 14)

Figure 2:
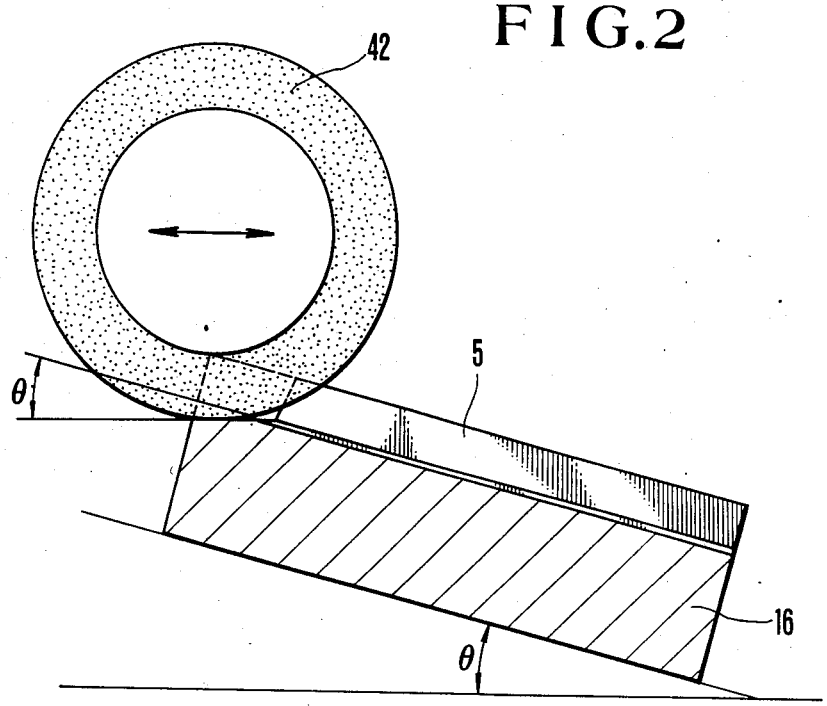
FIG. 2 shows how to grind out the clearance groove of a bearing according to the present invention.
Figure 3:
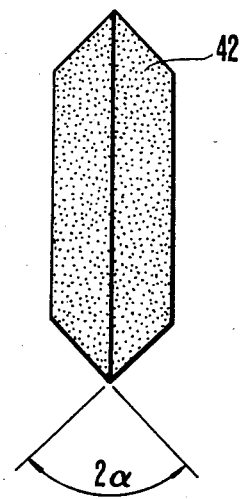
FIG. 3 is a front view of the grindstone shown in FIG. 2.

FIGS. 2 and 3 show an example how to form the clearance groove 27 in FIG. 1. Forming conditions are that the most suitable inclination angle $\theta$ of the clearance groove, etc. are established to the bearing and then, by using the value $\theta$, the value $\alpha$, that the expression $$\tan \alpha > 1/\cos \theta$$

is established, is determined. Next, a grindstone 42 is dressed to have angle $2\alpha$, and then the clearance groove is ground out into the track member 16 which is laid at inclination angle $\theta$.

For example, values are set as follows:

$$\alpha = 45.25° \text{ for } \theta = 1.458°, \text{ or}$$

$$\alpha = 45.5° \text{ for } \theta = 0.25°$$

In case of a bearing wherein a casing and a track member are formed integrally, the work can be done by slanting either the table of the grinding machine or the grindstone as shown in FIG. 2, this work is not particularly a high technique.

Figure 12:
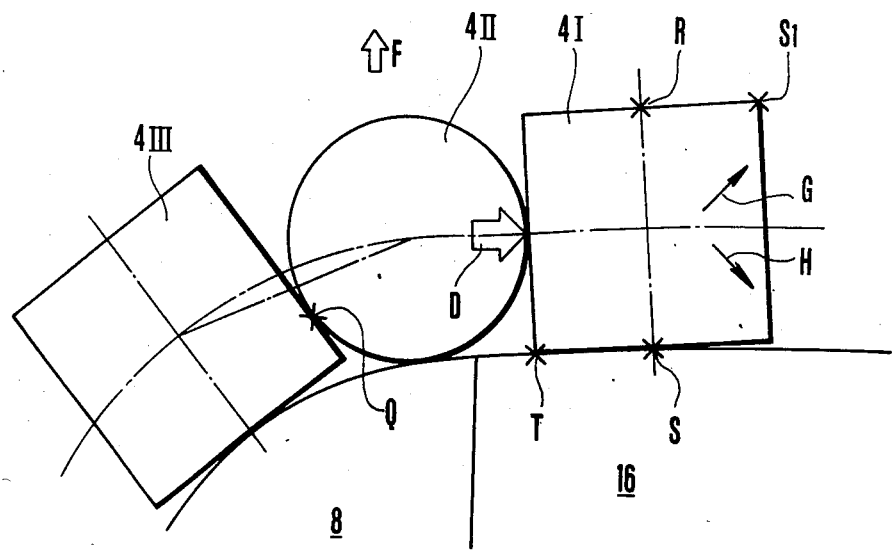
Figure 13:
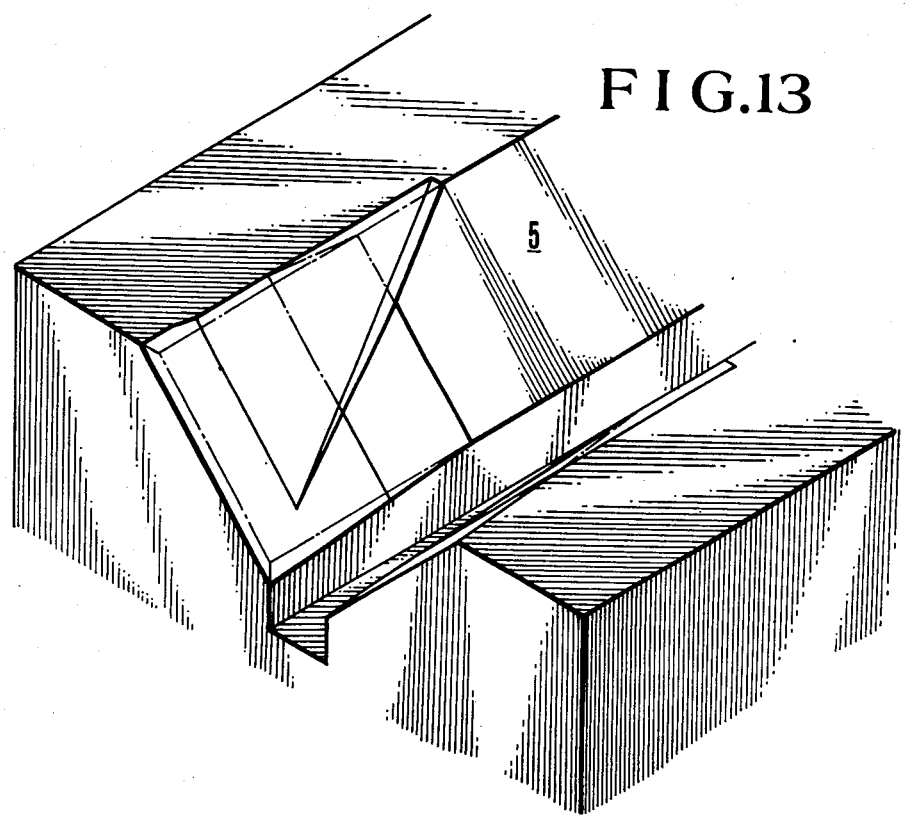
FIG. 13 is a view showing another conventional art.

Next, explanation is given on effects of the working example shown in FIG. 1. Since the apex 40 of the V-shaped boundary line 28 is projecting to the side of the clearance groove 27, a roller entering the track groove 5 from the clearance groove 27 passes firstly the region of the apex 40, then it is thrusted into the load zone (track groove 5). As the result of it, in the track groove 5 of the track member 16, different from the case of FIG. 9, the concentrated load is not added to the upper portion of the slanting face of the track groove, but it is added rather to the region of the bottom of the track groove. Therefore, there occurs no tendency that the roller will turn round toward the direction of arrow E shown in FIG. 10. And that the concentrated load (contact stress) is added to the region of the bottom of the track groove conduces to the result that the roller 4 I in FIG. 12 is skewed (inclined) in the direction of arrow H with point S as its center. That the roller 4 I is skewed in the direction of the arrow H constitutes an action to push the roller 4 I against the track groove (slanting face of the track groove), hence the skew itself of the roller 4 I becomes smaller, the inclination of the roller in the advance direction is restrained, there is no apprehension that the roller may be locked in the track groove. Accordingly the roller, guided by the track groove (slanting face of the track groove), rolls smoothly in the endless circulation path, and the overall slide resistance of the bearing is also reduced.

Figure 4:
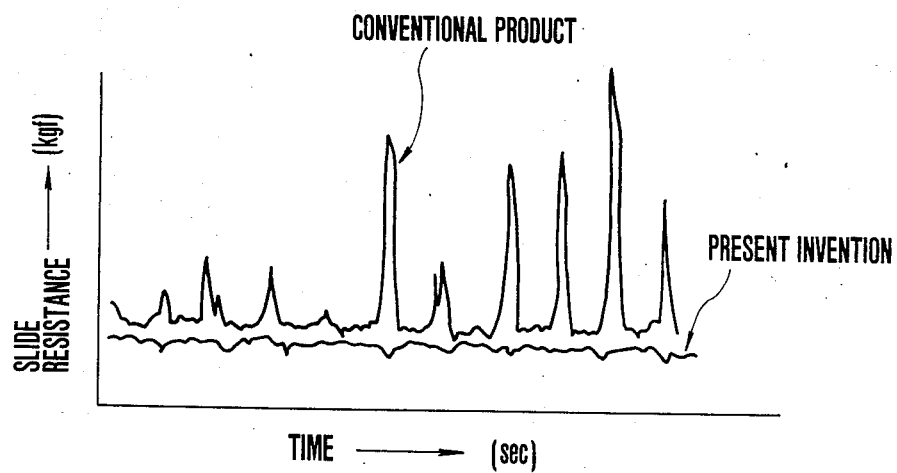
FIG. 4 shows comparison of slide resistance made between a conventional bearing and a bearing of the present invention.

FIG. 4 shows comparison of magnitudes of the slide resistance between a bearing of the prior art (conventional product) and a bearing according to the present invention, it can be seen from the graph that the bearing of the present invention has obviously less slide resistance as compared with the conventional product.

Effects of the present invention are ennumerated below:

(1) since the configuration of the clearance groove is simple, grinding work of the clearance groove on the both end faces of the track groove can be done automatically and in production by using a grinding machine, (2) skew in a direction, in which the roller moving from the no-load zone to the load zone springs out, can effectively be restrained, consequently the slide resistance of the bearing can be reduced, (3) the displacement in running can also be reduced, (4) production cost can be held down reasonably, (5) stick slip is further reduced, as compared with conventional bearings.

Figure 5:
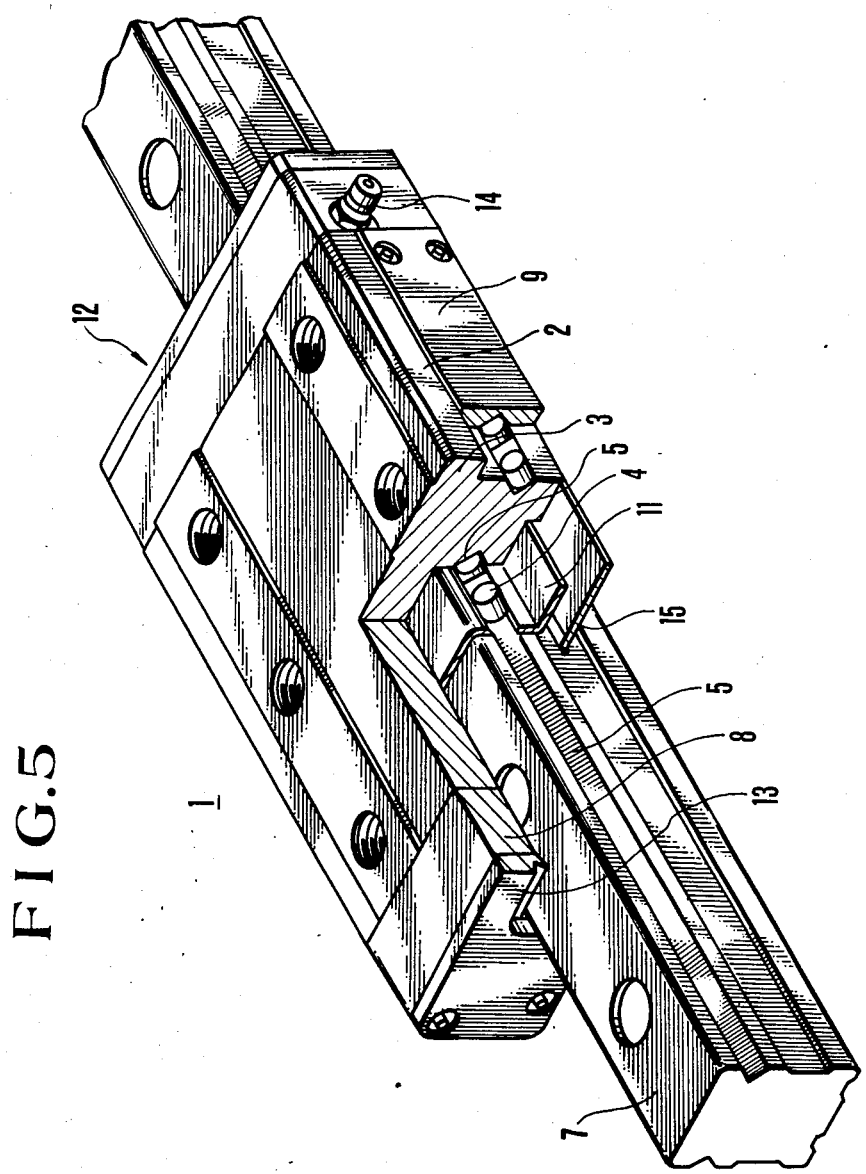
FIG. 5 is a perspective view of a roller bearing of the type to which the present invention belongs.
Figure 6:
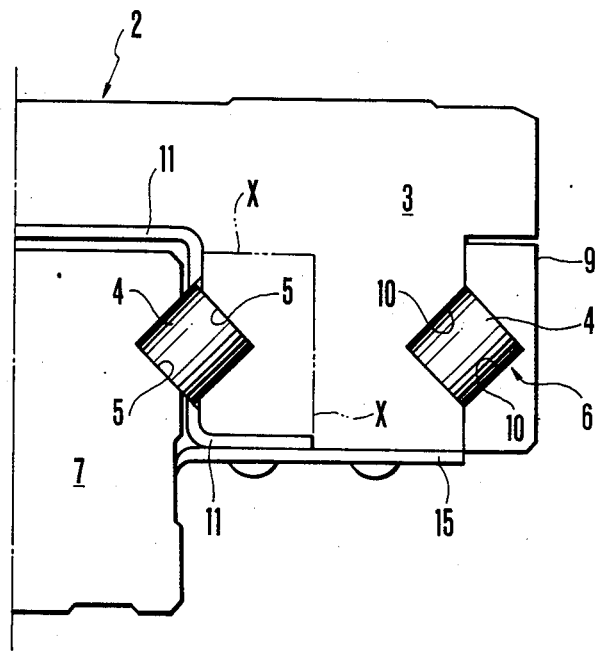
FIG. 6 is a partially enlarged section of the bearing in FIG. 5.

Incidentally, the present invention is applicable not only to the bearing shown in FIG. 5, but also to any other similar well-known bearings for endless linear motion.

What is claimed is:

1. A bearing for endless linear motion, wherein said bearing comprises rolling elements being rollers arranged in a cross-roller mode, a slide unit provided with an endless circuit having a linear track groove, and a long-size track rail provided with a track groove formed in its outer face, the track groove of the slide unit and the track groove in the outer face of the track rail being positioned opposite each other to form a load zone of the endless circulation path for the rollers, characterized in that a slightly inclined clearance groove is provided respectively at the both ends of the track groove on the side of the slide unit, each angle of the clearance grooves is formed greater than the angle of the track groove, and the boundary line formed between the track groove and the clearance groove takes shape of V, as seen from the side of the end face of the track rail, and the apex of the V-shape is porjecting to the side of the clearance groove.

2. A bearing for endless linear motion as claimed in claim 1, wherein if the angle formed in the both ends of the track groove is taken to be $2\alpha$, and the inclination angle of the clearance groove is taken to be $\theta$, then the following expression is established;

$$\tan \alpha > 1/\cos \theta.$$

* * * * *